United States Patent Office

3,548,046
Patented Dec. 15, 1970

3,548,046
GRANULATION OF OIL-COATED WATER-SOLUBLE FINE PARTICLE OF POTASH MATERIAL
William E. Savage, Castro Valley, Calif., assignor to Shell Oil Company, New York, N.Y., a corporation of Delaware
No Drawing. Filed Nov. 13, 1967, Ser. No. 682,591
Int. Cl. B01j 2/00
U.S. Cl. 264—118                                7 Claims

ABSTRACT OF THE DISCLOSURE

An improved method of forming tough granules of potash material from water-soluble fine particle of potash material by adding to the fine potash material a small amount of oil, forming fresh surfaces by suitable means, followed by compacting and finally granulating the compacted material.

---

The present invention relates to an improved method of forming attrition resistant granules from water-soluble solid fines. More particularly, the present invention relates to a new and novel process for making tough, attrition resistant water-soluble solid granules from fines with considerably less internal recycling than normally required for conventional compacting of oil-free fines.

BACKGROUND OF THE INVENTION

It is well known in the art that a desirable method of recovering and transporting water-soluble solids such as solid fertilizers, e.g., potash, phosphates, etc., is to form slurries of said solids in a liquid carrier and recovering as in the case of solution mining or in pipeline transportation the solid material from the liquid at a terminal end. In the slurry form the solids are generally in very fine particle form (fines) which on recovery from a liquid carrier are difficult to handle and are not suitable for commercial use, resulting in economic losses.

Generally, solid fines are granulated by first compacting or densifying them and thereafter granulating the compacted or densified fines into granules of desired dimension. However, compaction of fines, e.g., potash, is costly and any reduction in internal recycling results in considerable saving. Water-soluble fines such as alkali metal salts or various other alkali compounds, e.g., potash salts, such as muriate of potash (sylvite) sodium chloride, soda ash, sodium sulfate, diammonium phosphate, phosphate rock and the like, as well as various fertilizer materials are particularly costly to compact and granulate into tough granules which resist attrition and meet standard commercial granulation requirements to meet market standards.

Conventional marketed potash, e.g., sylvite (KCl), is generally reconstituted by compaction followed by granulation. Sylvite has a density of 124.5 lb./cu. ft., and when KCl fines are compacted, the flakes tinkle like glass when rattled together. Particles of non-compacted sylvite have a hardness of 11 pounds or more.

By solid particle fines is meant solid particle fines having generally dimensions of less than 60 mesh to less than 400 mesh and granular particles are within the meaning of the term used in the art, as, for example, in the fertilizer industry and as defined above.

It is an object of the present invention to compact and granulate water-soluble solid particle fines.

Still another object of the present invention is to compact and granulate oil-containing water-soluble solid fertilizer fines.

Still another object of the present invention is to compact and granulate oil-containing potash fines which granules are resistant to attrition.

These and other objects will be apparent from the following description of the invention.

SUMMARY OF THE INVENTION

It has now been discovered that the addition of a small amount (0.01 to 1% wt.) of liquid hydrocarbon such as crude oil and fractions thereof to clean water-soluble solid particle fines results in less internal recycling in the compaction and granulation process and produces tough granules which resist attrition. Prior to granulation it is essential that the fines be admixed with a small amount of liquid hydrocarbon and thereafter be tumbled, ground, etched or treated in some other suitable mechanical and/or chemical means so as to produce fresh surfaces which on compaction into sheets are thereafter flaked and granulated into desired tough, attrition resistant granules.

By internal recycling is meant the amount of fines passing through the compaction process and which must be returned to the compactor for repeated processing because the fines were under required size. Thus, the less fines returned as recycle, the more effective the process because more fresh feed can be forced through the compactor.

The present invention is therefore directed to an improved process for preparing tough, attrition resistant granules comprising the following steps:

(1) to water-soluble solid particle fines, e.g., potash, recovered from solution mining or by other means, a small amount (0.01–1%) of a liquid hydrocarbon is added preferably at elevated temperatures to the fines so that the fines are coated by the liquid hydrocarbon;

(2) the hydrocarbon coated fines are then subjected to a chemical and/or mechanical attrition treatment, e.g., chemical etching or mechanical tumbling or grinding;

(3) the ground or etched hydrocarbon coated fines are then compacted or densified preferably into thin sheets having a thickness of from about 0.05 to 0.5 inch; and, (4) the compacted or densified sheets are then flaked and thereafter granulated or directly granulated into desired granular particle sizes.

If the hydrocarbon (oil)-coated fines contain more than 1% oil, it is desirable to heat-treat the coated fines prior to step 2 by suitable means, e.g., vacuum or kiln drying, at a temperature which may range from about 200° F. to above 1000° F. so as to vaporize off part of the hydrocarbon and reduce its content to less than 1% and preferably to less than 0.1% by weight based on the fresh oil-free fines.

All of the process steps essential to the present invention should be preferably carried out at about ambient temperature and preferably in a continuous and uninterrupted manner.

A method for granulating solid fines such as potash particle fines which may contain from 0.1% to 1% oil by the process of this invention is to heat-treat the fines at an elevated temperature of around 950° F. to reduce the oil content to less than 0.1% and preferably to less than 0.05%. The fines are then subjected at ambient temperature to tumbling or grinding or other suitable methods to achieve formation of fresh, clean surfaces. The freshly surfaced particle fines are directly compacted into thin sheets of less than 0.25 inch thick and thereafter flaked and/or granulated into desired granular particle sizes. Without rendering these oil-containing particle fines to step (1) of the present invention, such materials as oil-containing potash, e.g., oil-containing sylvite, cannot be compacted and granulated satisfactorily to a salable product. Thus, step (2) can be regarded as the essential step in the process of granulating fines by the process of the present invention. Also, the temperature conditions and the continuous order of steps as outlined above are essential to achieving a successful granulation process in accordance with the teaching of the present invention.

PREFERRED EMBODIMENT OF THE INVENTION

A method of reconstituting potash fines, e.g., sylvite fines into tough granules comprises adding to the fines about 0.01%–0.3% oil. The oil coated fines are then ground, compacted and granulated into exceptionally strong granules. Without grinding the oil coated fines, e.g., oil coated sylvite fines, it is impossible to compact the sylvite fines and without the presence of the oil tough granules, resistance to attrition cannot be obtained.

As mentioned above, it has been found that oil coated soluble fines, e.g., oil coated solid fines, produce tough granules; however, prior to granulation, the coated fines must be ground or etched to effect good compaction prior to granulation. Grinding of the oil coated fines is preferred and this can be accomplished by passing the mixture of oil-containing sylvite and oil-free sylvite through a two-roll granulator employing rolls set face-to-face. The rolls are generally restrained from moving apart by heavy springs.

The nature of compactable crystalline materials causes mergence of the individual particles into a continuous sheetlike crystal under the extreme pressures of a smooth roll compactor.

Fines not compacted fall through the flake breaker unchanged and can be returned to the compactor for further processing. The fines produced in breaking the compactor sheet can be mixed with these fines and returned to the compactor.

The flaked material can be put through a suitable granulator, e.g., a two-deck granulator, with, for example, granulator rolls in which one roll of each pair has longitudinal grooves and the other has circumferential grooves. Such rolls can produce −6 to +14 mesh granules (Tyler). Product from these rolls can be adjusted to produce 30% +6 mesh, 65% −6 to +30 mesh and 5% −30 mesh. The +6 oversize granules can be passed through rolls giving about 10% +6, 85% −6 to +30, and 5% −30.

The granulated product can be screened to remove granulator fines which can be sent to the compactor. In the complete scheme, granulator fines and compactor fines are combined and recycled to the compactor.

The effectiveness of compacting and granulating materials such as sylvite fines into product meeting commercial standards by the process of the present invention is illustrated by the following examples.

TABLE 1.—COMPACTION OF SYLVITE

| Example | Amount of recycle as a percentage of gross compactor feed | Oil content, percent |
|---|---|---|
| (1) Not ground, compacted | 60 | None |
| (2) Ground and compacted | 25 | 0.02–1 |

A test of product quality in regard to attrition resistance is its hardness expressed as the average force required to crush +10 mesh particles. The results on samples noted below were as follows:

TABLE 2.—HARDNESS OF COMPACTED SYLVITE

| Example | Hardness, pounds | Oil content, percent |
|---|---|---|
| (1) Not ground, compacted | 9 | None |
| (2) Ground and compacted | 4 | 0.3 |
| (3) Ground and compacted | 1 | 1.0 |
| (4) Ground and compacted | 14 | 0.037 |

The foregoing description of the invention is merely intended to be explanatory thereof. Various changes in the details of the method may be made, within the scope of the appended claims, without departing from the spirit of the invention.

I claim as my invention:
1. A process for producing tough attrition resistant potash granules from potash particle fines, comprising:
 (a) coating said potash particle fines with a liquid hydrocarbon in an amount of 0.01% to 1% by weight of said fines,
 (b) subjecting said coated fines to an attrition treatment to produce fresh clean surfaces upon said particles,
 (c) compacting said treated fines into thin sheets, and
 (d) granulating said compacted sheet to form said tough attrition resistant granules.
2. The process of claim 1 wherein after compacting the potash particle fines into sheets, said sheets are flaked.
3. The process of claim 2 wherein said attrition treatment in step (b) of claim 1 is produced by chemical etching.
4. The process of claim 2 wherein said attrition treatment in step (b) of claim 1 is produced by grinding.
5. The process of claim 2 wherein said attrition treatment in step (b) of claim 1 is produced by tumbling.
6. The process of claim 1 wherein the potash fines are sylvite.
7. The process of claim 2 wherein the potash fines are sylvite.

References Cited

UNITED STATES PATENTS

| 1,528,851 | 3/1925 | Rodling et al. | 264—117 |
| 3,135,473 | 6/1964 | Schrader | 264—140X |
| 3,433,863 | 3/1969 | Bowden et al. | 264—140X |

ROBERT F. WHITE, Primary Examiner

J. R. HALL, Assistant Examiner

U.S. Cl. X.R.

264—140; 71—61, 64